United States Patent Office 3,272,800
Patented Sept. 13, 1966

3,272,800
PROCESS FOR PREPARING Δ⁴-3-KETOSTEROIDS
Katsumi Tanabe, Rinji Takasaki, Ryozo Hayashi, Yasuhiro Morisawa, Teruo Hashimoto, and Yutaka Okada, all of Tokyo, Japan, assignors to Sankyo Company Limited, Tokyo, Japan
No Drawing. Filed Sept. 27, 1965, Ser. No. 490,657
Claims priority, application Japan, Sept. 30, 1964, 39/55,859; Oct. 6, 1964, 39/57,012; Jan. 19, 1965, 40/2,850; June 11, 1965, 40/34,704
12 Claims. (Cl. 260—239.55)

This invention relates to a novel process for the preparation of Δ⁴-3-ketosteroids. More particularly, it relates to a novel process for preparing Δ⁴-3-keto steroids.

Heretofore, there have been reported a number of processes for preparing Δ⁴-3-ketosteroids, and, as a typical one, the procedure which comprises treating a 6-hydroxy-3,5-cyclosteroidal compound with acid followed by subjecting to Oppenauer oxidation is well known by those skilled in the art.

Further, there have also been reported a number of processes for preparing 19-hydroxy-Δ⁴-3-ketosteroids. For example, there are well known those procedures appeared in Chemical & Engineering News (Sept. 10, 1962), 64; J. Org. Chem., 15, 264 (1950); ibid., 19, 1758 (1954); and Experientia, 11, 99 (1955).

There are, however, remained some problems to be improved, such as those concerning with yield of the desired product or a number of steps involved. Thus, a novel and advantageous process for the preparation of Δ⁴-3-ketosteroids or 19-hydroxy-Δ⁴-3-ketosteriods has been earnestly desired in the art.

It is, therefore, an object of this invention to provide a novel and commercially available process for preparing Δ⁴-3-ketosteroids, which are useful as a medicine or an intermediate for the synthesis of valuable 19-norsteriods.

Other objects of this invention will be apparent from the following detailed description.

It has been unexpectedly discovered that a Δ⁴-3-ketosteroid can be formed by treating a 3,5-cyclosteroid containing $C_6$–O linkage, such as a 6β,19-oxido linkage or hydroxy group, an etherified hydroxy group or an esterified hydroxy group at $C_6$-position.

The novel process in accordance with this invention comprises heating a 3,5-cyclosteroid having the partial structure, with which only rings A and B are concerned, of the formula

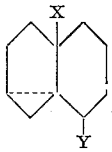

wherein X represents an alkyl group or a hydroxymethyl group that may be etherified or esterified; Y represents hydroxy group, an etherified hydroxy group or an esterified hydroxy group; or X and Y jointly may form a 6β,19-oxido linkage together with an alkylsulfoxide in the presence of or in the absence of a catalyst to form a Δ⁴-3-ketosteriod having the partial structure, with which only rings A and B are concerned, of the formula

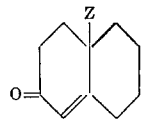

wherein Z is as defined above with relation to the X when X and Y separately are as defined above, and Z is hydroxymethyl group when X and Y jointly form a 6β,19-oxido linkage. In the process in accordance with this invention, where a 3,5-cyclosteroid containing the 6β,19-oxido linkage is treated with an alkylsulfoxide, a 19-hydroxy-Δ⁴-ketosteroid is formed under cleavage of oxygen bridge and with oxidation, and where a 3,5-cyclosteroid having hydroxy group, an etherified hydroxy group or an esterified hydroxy group at $C_6$ is treated with an alkylsulfoxide, a Δ⁴-3-ketosteroid in which the same group at $C_{10}$ as that of a starting steroid is remained unchanged is formed, and in the latter case, the said unchanged group at $C_{10}$ is limited to an alkyl group and a hydroxymethyl group that may be etherified or esterified.

The starting 3,5-cyclosteroid to be employed in the process outlined above is selected from the group consisting of 3,5-cyclosteroids of the androstane, pregnane and cholestane series; having hydroxy group, etherified hydroxy group or esterified hydroxy group at $C_6$; or containing the 6β,19-oxido linkage. At $C_1$, $C_2$, $C_7$, $C_8$, $C_9$, $C_{11}$, $C_{12}$, $C_{14}$, $C_{15}$, $C_{16}$, $C_{17}$, $C_{18}$, $C_{19}$, $C_{20}$ and/or $C_{21}$ of the above-specified starting steroids, there may be further present a keto group (=O), a ketalized oxo group, an enolated oxo group, an etherified hydroxy group, an esterified hydroxy group, an alkyl group, an alkynyl group, a halogeno alkynyl group, a halogen atom or a carboxyl group with or without hydroxy group or acyloxy group at $C_{17}$. There may be more further other groups in the molecule of the starting steroid which does not interfere with the reaction such as a double bond between $C_9$ and $C_{11}$ or $C_{16}$ and $C_{17}$; oxido group (>O) and the like.

Examples of convenient starting steroids are as follows:

(A) 3,5-CYCLOSTEROIDS CONTAINING THE 6β,19-OXIDO LINKAGE

3α,5-cyclo-6β,19-oxido-5α-androstan-17-one and the 17-ethyleneketal thereof;

3α,5-cyclo-6β,19-oxido-5α-androstan-17β-ol and the esters thereof, preferably, 17-acetate, 17-decanoate, 17-benzoate, 17-cyclopentylpropionate and 17-phenylpropionate;

the 17α-alkyl, -alkenyl, -alkynyl, or -halogenoalkynyl derivatives of 3α,5-cyclo-6β,19-oxido-5α-androstan-17-ol, preferably the corresponding 17α-methyl, 17α-ethyl, 17α-(2′-propionyl), 17α-ethynyl, 17α-chloroethynyl and 17α-vinyl derivatives;

3α,5-cyclo-6β,19-oxido-5α-pregnan-20-one and the 20-ethyleneketal thereof; and

3α,5-cyclo-6β,19-oxido-5α-cholestane.

(B) 3,5 - CYCLOSTEROIDS HAVING HYDROXY GROUP, AN ETHERIFIED HYDROXY GROUP OR AN ESTERIFIED HYDROXY GROUP AT $C_6$ (1) 3,5-cyclosteroids of the androstane series:

3α,5-cyclo-6β(or 6α)-hydroxy-5α-androstan-17-one and the 17-ketal derivatives thereof and the corresponding 6β(or 6α)-esterified or etherified hydroxy derivatives, preferably, the corresponding 6β(or 6α)-acetoxy, -propionyloxy, -methoxy, -ethoxy and -propoxy derivatives;

3α,5-cyclo-6β,17β-dihydroxy-5α-androstane and the esters and ethers thereof, preferably, the corresponding diacetate, 6β-methoxy 17-monoacetate and 6β-methoxy 17-monobenzoate;

the 17α-alkyl, -alkenyl, -alkynyl and -halogenoalkynyl derivatives of 3α,5-cyclo-5α-androstane-6β,17β-diol and the ethers and esters thereof, preferably, the corresponding 17α-methyl, -vinyl, -ethynyl, -chloroethynyl and -propynyl derivatives;

3α,5-cyclo-6β(or 6α), 19-dihydroxy-5α-androstan-17-one and the 17-ketal derivatives thereof and the corresponding ethers and esters, preferably, the corresponding 17-ethyleneketal, 6β-acetoxy, 6β,19-diacetoxy and 6β-methoxy-19-acetoxy derivatives;

3α,5-cyclo-6β,17β,19-trihydroxy-5α-androstane and the esters and ethers thereof, preferably, the corresponding 6-acetate, 6,17-diacetate, 6,17,19-triacetate, or benzoates, 6β-methoxy 17-monoacetate, 6β-methoxy 17,19-diacetate;

the 17α-alkyl, -alkenyl, -alkynyl and -halogenoalkynyl derivatives of 3α,5-cyclo-5α-androstane-6β,17β,19-triol and the ethers and esters thereof, preferably, the corresponding 17α,methyl, -vinyl, -ethynyl and -chloroethynyl derivatives and the corresponding 6-monoacetate, 6,17-diacetate and 6,17-19-triacetate and benzoate derivatives thereof;

(2) 3α,5-cyclo-6β-hydroxy-5α-pregnan-20-one and the esters and ethers thereof, preferably, the corresponding 6β-methoxy and 6β-acetoxy derivatives;

3α,5-cyclo-6β,17α-dihydroxy-5α-pregnan-20-one and the esters and ethers thereof, preferably, the corresponding 6-acetate;

3α,5-cyclo-6β,19-dihydroxy-5α-pregnan-20-one and the esters and ethers thereof, preferably, the corresponding 6β-methoxy and 6β,19-diacetoxy derivatives;

3α,5-cyclo-6β,17α,19-trihydroxy-5α-pregnan-20-one and the esters and ethers thereof, preferably, the corresponding 6β,17α,19-triacetate; and (3) 3α,5-cyclo-6β-hydroxy-5α-cholestane and 3α,5-cyclo-6β,19-dihydroxy-5α-cholestane.

In one embodiment of the process according to this invention, the reaction can be easily conducted by dissolving a starting 3,5-cyclosteroid in an alkylsulfoxide and then heating the resulting solution. Representative examples of alkylsulfoxide to be employed in the process include dimethylsulfoxide, diethylsulfoxide, tetramethylenesulfoxide and the like, and dimethylsulfoxide is most preferable because of commercial availability. The reaction may also be carried out in the presence of a suitable solvent. Examples of suitable solvents employed are water and an inert organic solvent for example benzene or xylenes. The reaction temperature is not a critical feature of this invention and, in general, it is preferred to carry out the reaction at a temperature ranging from about 80° C. to 150° C. and most preferably at about 90–120° C. The reaction time depends mainly upon the reaction temperature employed and, usually, it is preferred to carry out the reaction for about 1–17 hours. Also, the reaction may be conducted under an inert atmosphere such as under a stream of nitrogen gas.

After completion of the reaction, the reaction product may be recovered from the reaction mixture by a known procedure. For instance, the reaction product may be recovered with a simple procedure which comprises only removing the alkylsulfoxide by distillation under reduced pressure. In some cases, the reaction product may also be recovered by pouring the reaction mixture into water, extracting the resulting mixture with a suitable extract solvent such as ether, benzene or ethyl acetate, washing the extract with water followed by removal of the solvent.

In another embodiment of the process according to this invention, the reaction can be conveniently conducted by heating a starting 3,5-cyclosteroid together with an alkylsulfoxide in the presence of a catalyst. Typical examples of the catalyst to be employed include the following compounds:

a mineral acid such as hydrochloric acid, sulfuric acid, perchloric acid and the like;

a Lewis acid, such as borontrifluoride etherate, aluminum chloride and the like;

a tertiary amine acid addition salt such as hydrochlorides and sulfates of trimethylamine, triethylamine, pyridine and the like;

an organic acid, such as formic acid, acetic acid, oxalic acid and the like;

an organic compound which is normally employed as an initiator in a radical reaction, such as organic peroxides, for example, benzoyl peroxide or di-t.-butyl peroxide, α,α'-azo-bis-isobutyronitrile and the like;

a halogen, such as iodine and the like; and a N-halogenoamide, such as N-bromoacetamide, N-bromosuccinamide, N-bromophthalimide and the like.

Among the foregoing such an organic radical reaction initiator as organic peroxides and α,α'-azo-bis-isobutyronitrile are most preferable. Generally, the reaction may satisfactorily proceed by employing a catalytic amount of the above-listed catalyst, thereby resulting in the reduction of the reaction time, normally to several hours. The order for addition of a starting steroid, an alkylsulfoxide and a catalyst is not specified, and these reactants may be added to the reaction system in any desired order. In general, it is convenient that a starting steroid and a catalyst together are first charged into a suitable reaction vessel and then an alkylsulfoxide is added thereto. The reaction conditions such as the reaction temperature and time may be those of the above-mentioned embodiment without a catalyst. Similarly, in this case, the reaction product may be recovered by a known procedure as set forth above.

The following specific examples serve to illustrate this, but are not intended to limit its scope.

*Example 1.—19-hydroxy-androst-4-ene-3,17-dione*

In a 100 ml. flask is placed 0.5 g. of 3α,5-cyclo-6β,19-oxido-5α-androstan-17-one and then 20 ml. of dimethylsulfoxide. The flask is placed in a thermostat bath maintained at about 100° C. and the content of the flask is maintained at 100° C. for 7 hours.

After completion of the reaction, the reaction mixture is concentrated to dryness under reduced pressure, the residue dissolved in 50 ml. of ethyl acetate, the solution thus obtained is washed with two portions of 50 ml. of a saturated aqueous sodium chloride solution, dried over anhydrous sodium sulfate and then the ethyl acetate is distilled off under reduced pressure to give 0.472 g. of the crude product. The crude product thus obtained is dissolved in benzene, the resulting solution is chromatographed on neutral alumina (23.5 g.; Woelm grade III) and from the eluate with benzene-ethylether (9:1) is obtained 0.37 g. of the desired product as pure crystals melting at 167.5–169° C. Mixed melting point on admixture with the authentic sample shows no depression and its infrared spectrum is identical with that of the authentic sample. Yield: 70%, based upon the theoretical yield.

*Examples 2 and 3*

The preparation of 19-hydroxy-androst-4-ene-3,17-dione in the absence of a solvent is illustrated in the above Example 1. Representative examples of the preparation of the same steroid as in Example 1 in the presence of a solvent are summarized hereinbelow. The procedures are similar to that of Example 1.

| Example No. | Solvent employed (ml.) | The desired product | |
|---|---|---|---|
| | | M.P. (° C.) | Yield (percent) |
| 2 | Distilled water (0.4) | 170–171 | 46 |
| 3 | Xylene (10) | 170–171 | 50 |

*Example 4.—17β,19-dihydroxy-androst-4-en-3-one 17-acetate*

In a 100 ml. eggplant type flask is placed 0.5 g. of 3α,5-cyclo-6β,19-oxido-5α-androstan-17β-ol 17-acetate and then 20 ml. of dimethylsulfoxide. The flask is placed in a thermostat bath maintained at about 100° C. and the content of the flask is maintained at 100° C. for 14 hours.

After completion of the reaction, the reaction mixture is treated in the same manner as in Example 1 to give 0.358 g. of the desired product, melting at 170–172° C.

Mixed melting point on admixture with the authentic sample shows no depression and its infrared spectrum is identical with that of the authentic sample. Yield: 68.2%, based upon the theoretical yield.

By the same procedure as in the above Example 4, the following steroids can be obtained from the corresponding $3\alpha,5$-cyclo-$6\beta,19$-oxido-$5\alpha$-steroids;

$17\alpha$-methyl-$17\beta,19$-dihydroxy-androst-4-en-3-one, melting at 193–194° C. (Yield: 64%, based upon the theoretical yield.) and $17\alpha$-ethynyl-$17\beta,19$-dihydroxy-androst-4-en-3-one, melting at 254–256° C. (Yield: 58.3%, based upon the theoretical yield.)

*Example 5.—$17\beta,19$-dihydroxy-androst-4-en-3-one 17-acetate*

In a 100 ml. eggplant type flask are placed 0.5 g. of $3\alpha,5$-cyclo-$6\beta,19$-oxido-$5\alpha$-androstan-$17\beta$-ol 17 - acetate and two drops of concentrated sulfuric acid and then 20 ml. of dimethylsulfoxide is added thereto. The flask is placed in a thermostat bath maintained at about 100° C. and then the content of the flask is maintained at about 100° C. for 4 hours.

After completion of the reaction, the reaction mixture is concentrated to dryness under reduced pressure, the residue is dissolved in 50 ml. of ethyl acetate and the resulting solution is washed with two portions of 50 ml. of a saturated aqueous sodium chloride solution, dried over anhydrous sodium sulfate and then the ethyl acetate is distilled off to give 0.394 g. of the crude product. The crude product thus obtained is dissolved in a mixture of benzene and n-hexane (1:1) and the solution is chromatographed on neutral alumina (20 g.; Woelm grade III). From the eluate with benzene-ethylether (1:1) is obtained 0.215 g. of the desired product in a purified form. It melts at 170–172° C., mixed melting point on admixture with the authentic sample shows no depression and its infrared spectrum is identical with that of the authentic sample.

Except that one drop of borontrifluoride etherate is employed instead of two drops of concentrated sulfuric acid, the same procedure as set forth above is repeated to give 0.548 g. of the crude product. The crude product thus obtained is dissolved in benzene, the resulting solution is chromatographed on neutral alumina (27 g.; Woelm grade III) and from the eluate with benzene-ethylether (9:1) is obtained 0.32 g. of the pure desired product, melting 171–172° C. Yield: 61%, based upon the theoretical yield. It is identical with the authentic sample by mixed melting point and infrared spectrum.

*Example 6.—19-hydroxy-androst-4-en-3,17-dione*

In a 100 ml. flask are placed 0.5 g. of $3\alpha,5$-cyclo-$6\beta,19$-oxido-$5\alpha$-androstan-17-one and 0.01 g. of triethylamine hydrochloride and then 20 ml. of dimethylsulfoxide is added thereto. The flask is placed in a thermostat bath maintained at about 100° C. and then the content of the flask is maintained at 100° C. for 6.5 hours.

After completion of the reaction, the reaction mixture is treated in the same manner as in Example 5 to give 0.515 g. of the desired product as an oily substance. The substance thus obtained is chromatographed on neutral alumina (25 g.; Woelm grade III) and from the eluate with ethyl acetate-benzene (1:4) is obtained 0.364 g. of the pure desired product, melting at 170–171° C. Its infrared spectrum is identical with that of the authentic sample.

*Examples 7, 8 and 9*

The preparation of 19-hydroxy-androst-4-ene-3,17-dione in the presence of triethylamine hydrochloride as a catalyst is illustrated in the above Example 6. Examples of the preparation of the same steroid as in Example 6 in the presence of other catalysts are shown hereinbelow; the procedures are similar to that of Example 6.

| Example No. | Catalyst employed (amount) | The desired product | |
|---|---|---|---|
| | | M.P. (° C.) | Yield (g.) |
| 7 | Pyridine hydrochloride (0.05 g.). | 170–171 | 0.306 |
| 8 | Acetic acid (one drop) | 170–171 | 0.277 |
| 9 | $\alpha,\alpha'$-azo-bis-isobutyronitrile (0.01 g.). | 170–171 | 0.405 |

*Example 10.—$17\beta,19$-dihydroxy-androst-4-en-3-one*

In a 100 ml. eggplant type flask are placed 0.5 g. of $3\alpha,5$-cyclo-$6\beta,19$-oxido-$5\alpha$-androstan-$17\beta$-ol and 0.01 g. of benzoylperoxide followed by addition of 20 ml. of dimethylsulfoxide. The flask is placed in a thermostat bath maintained at about 100° C. and then the content of the flask is maintained at 100° C. for 2 hours and 40 minutes.

After completion of the reaction, the reaction mixture is concentrated to dryness under reduced pressure to give 0.555 g. of the desired product as a crude crystalline substance. The substance thus obtained is recrystallized from acetone-n-hexane (1:3) to give 0.373 g. of the pure product as crystals, melting at 201–203° C. The mother liquor is then concentrated to dryness, the residue is dissolved in benzene, the resulting solution is chromatographed on neutral alumina (5 g.; Woelm grade III) and from the eluate with benzene-ethylacetate (4:1) is additionally obtained 0.067 g. of the desired product. Total yield: 0.440 g. Mixed melting point on admixture with the authentic sample shows no depression.

*Example 11.—19-hydroxy-androst-4-ene-3,17-dione*

In a 100 ml. flask are placed 1 g. of $3\alpha,5$-cyclo-$6\beta,19$-oxido-$5\alpha$-androstan-17-one and 0.2 g. of benzoyl peroxide followed by addition of 50 ml. of dimethylsulfoxide. The flask is then placed in a thermostat bath maintained at about 90° C. and the content of the flask is maintained at 90° C. for 5 hours.

After completion of the reaction, the reaction mixture is concentrated to dryness under reduced pressure, the residue is dissolved in 50 ml. of ethyl acetate and the resulting solution is washed with two portions of 50 ml. of a saturated aqueous sodium chloride solution, dried over anhydrous sodium sulfate and then the ethyl acetate is distilled off to give 1.26 g. of the desired product as a crude crystalline substance. The substance thus obtained is recrystallized from acetone-n-hexane (1:3) to give 0.792 g. of the desired product as needles melting at 170–171° C. From the mother liquor is obtained an additional amount of 0.089 g. of the desired product. Total yield: 83%, based upon the theoretical yield.

*Example 12.—$17\alpha$-ethynyl-$17\beta,19$-dihydroxy-androst-4-en-3-one*

In a 100 ml. eggplant type flask are placed 1.0 g. of $17\alpha$ - ethynyl-$3\alpha,5$-cyclo-$6\beta,19$-oxido-$5\alpha$-androstan-$17\beta$-ol and 0.04 g. of benzoyl peroxide and then 40 ml. of dimethylsulfoxide is added thereto. The flask is then placed in a thermostat bath maintained at about 100° C. and then the content of the flask is maintained at 100° C. for 2 hours and 40 minutes.

After completion of the reaction, the reaction mixture is concentrated to dryness under reduced pressure, the residue is dissolved in 120 ml. of ethyl acetate, the resulting solution is allowed to stand for a while, thereby being separated a crystalline substance. The substance is recovered by filtration to give 0.75 g. of the desired product as crystals melting at 248–250° C. From the mother liquor is obtained an addition amount of 0.108 g. of the desired product. Total yield: 0.858 g. (81%, based upon the theoretical yield). Mixed melting point on admixture with the authentic sample shows no depression.

*Example 13.—17α-chloroethynyl-17β,19-dihydroxy-androst-4-en-3-one*

In a 100 ml. three-necked flask are placed 1.5 g. of 17α - chloroethynyl-3α,5-cyclo-6β,19-oxido-5α-androstan-17β-ol and 0.06 g. of benzoyl peroxide and then 60 ml. of dimethylsulfoxide is added thereto. The content of the flask is maintained at 100° C. for 4 hours under a stream of nitrogen gas.

After completion of the reaction, the dimethylsulfoxide is distilled off under reduced pressure, while being under a stream of nitrogen gas. The yellow residue thus obtained is dissolved in 60 ml. of ethyl acetate, the resulting solution is washed three times with a saturated aqueous sodium chloride solution, dried over anhydrous sodium sulfate and then concentrated. The concentrate is allowed to stand, thereby being crystallized out 1.055 g. of the desired product, as needles. From the mother liquor is obtained an additional amount of 0.295 g. of the desired product. The combined product is recrystallized from acetone to give 1.015 g. of the desired product as needles melting at 199–200° C. Further, from the recrystalilzation mother liquor is obtained 0.245 g. of the desired product. Total yield: 1.260 g. (80.3%, based upon the theoretical yield).

*Analysis.*—Calculated for $C_{21}H_{27}O_3Cl$: C, 69.50; H, 7.50. Found: C, 69.39; H, 7.79.

*Example 14.—17β,19-dihydroxy-androst-4-en-3-one 17-acetate*

In a 100 ml. eggplant type flask are placed 1.00 g. of 3α,5-cyclo-6β,19-oxido-5α-androstan-17β-ol 17-acetate and 0.03 g. of benzoyl peroxide and then 40 ml. of dimethylsulfoxide is added thereto. The flask is placed in a thermostat bath maintained at about 100° C. and then the content of the flask is maintained at 100° C. for 5 hours.

After completion of the reaction, the reaction mixture is concentrated to dryness under reduced pressure to give 1.092 g. of a crystalline substance as a residue. The substance thus obtained is recrystallized from a mixture of ethyl acetate and n-hexane to give 0.554 g. of the desired product, melting at 170–172° C. Further, the oily substance obtained from the mother liquor is chromatographed on neutral alumina (15 g.; Woelm grade III) and, on eluting with a mixture of ethyl acetate and benzene (1:10), there is obtained 0.316 g. of the desired product. Total yield: 0.87 g. (83%, based upon the theoretical yield).

*Example 15.—17β,19-dihydroxy-androst-4-en-3-one 17-phenylpropionate*

The same procedure as in Example 14 is repeated except that 4.00 g. of 3α,5-cyclo-6β,19-oxido-5α-androstan-17β-ol 17-phenylpropionate, 0.08 g. of benzoyl peroxide and 140 ml. of dimethylsulfoxide are employed, to give 3.82 g. of the desired product melting at 133–134° C. Yield: 92% (based upon the theoretical yield).

*Example 16.—Androst-4-ene-3,17-dione*

In a 100 ml. flask is placed 1.00 g. of 3α,5-cyclo-6β-hydroxy-5α-androstan-17-one and then 40 ml. of dimethylsulfoxide. The flask is placed in a thermostat bath maintained at about 100° C. and then the content of the flask is maintained at 100° C. for 9 hours.

After completion of the reaction, the reaction mixture is concentrated to dryness under reduced pressure, the residue is dissolved in 50 ml. of ethyl acetate, the resulting solution is washed with two portions of 50 ml. of a saturated aqueous sodium chloride solution, dried over anhydrous sodium sulfate and the ethyl acetate is distilled off under reduced pressure to give 1.004 g. of the crude product. The product thus obtained is chromatographed on neutral alumina (30 g.; Woelm grade III) and from the eluate with n-hexane-benzene (1:2) is obtained 0.62 g. of the desired product in a purified form. It melts at 172–174° C. and its infrared spectrum is identical with that of the authentic sample. Yield: 62% (based upon the theoretical yield).

*Example 17.—Androst-4-ene-3,17-dione*

The same procedure as in Example 16 is repeated except that 0.5 g. of 3α,5-cyclo-6β-acetoxy-5α-androstan-17-one, and 20 ml. of dimethylsulfoxide are employed and the reaction is carried out at 100° C. for 4.5 hours and then at 110–115° C. for additional 3.5 hours, to give 0.28 g. of the desired product, melting at 171–173° C. Mixed melting point on admixture with the authentic sample shows no depression. Yield: 64.6% (based upon the theoretical yield).

*Example 18.—Androst-4-ene-3,17-dione*

The same procedure as in Example 16 is repeated except that 0.5 g. of 3α,5-cyclo-6β-methoxy-5α-androstan-17-one and 20 ml. of dimethylsulfoxide are employed to give 0.135 g. of the desired product melting at 172–174° C. Mixed melting point on admixture with the authentic sample shows no depression.

*Example 19.—Testosterone*

The same procedure as in Example 16 is repeated except that 1.00 g. of 3α,5-cyclo-5α-androstane-6β,17β-diol and 40 ml. of dimethylsulfoxide are employed to give 0.732 g. of the desired product melting at 152–154° C. Its infrared spectrum is identical with that of the authentic sample. Yield: 73% (based upon the theoretical yield).

*Example 20.—Progesterone*

The same procedure as in Example 16 is repeated except that 0.5 g. of 3α,5-cyclo-6β-hydroxy-5α-pregnan-20-one and 20 ml. of dimethylsulfoxide are employed and the reaction is carried out at 100–110° C. for 3 hours, to give 0.315 g. of the desired product melting at 128–129° C. Mixed melting point on admixture with the authentic sample shows no depression and its infrared spectrum is also identical with that of the authentic sample. Yield: 63% (based upon the theoretical yield).

*Example 21.—19-hydroxy-androst-4-ene-3,17-dione*

The same procedure as in Example 16 is repeated except that 0.552 g. of 3α,5-cyclo-6β,19-dihydroxy-5α-androstan-17-one and 20 ml. of dimethylsulfoxide are employed and the reaction is carried out at 100° C. for 12 hours, to give 0.088 g. of the desired product as needles melting at 170–171° C. Its infrared spectrum is identical with that of the authentic sample.

*Example 22.—Androst-4-ene-3,17-dione*

In a 100 ml. eggplant type flask are placed 1.00 g. of 3α,5-cyclo-6β-hydroxy-5α-androstan-17-one and 0.02 g. of benzoyl peroxide and then 50 ml. of dimethylsulfoxide is added thereto. The flask is placed in a thermostat bath maintained at about 100° C. and then the content of the flask is maintained at 100° C. for 4.5 hours.

After completion of the reaction, the reaction mixture is concentrated to dryness under reduced pressure, the residue is dissolved in 50 ml. of ethyl acetate, the resulting solution is washed with two portions of 50 ml. of a saturated aqueous sodium chloride solution and then dried over anhydrous sodium sulfate. The solvent is distilled off under reduced pressure to give 1.095 g. of the crude product. The product thus obtained is chromatographed on neutral alumina (30 g.; Woelm grade III) and elution with ethyl acetate-benzene (1:4) gives 0.755 g. of the desired product as pure crystals melting at 172–174° C. Its infrared spectrum is identical with that of the authentic sample. Yield: 75% (based upon the theoretical yield).

*Example 23.—Testosterone*

The same procedure as in Example 22 is repeated except that 0.5 g. of 3α,5-cyclo-5α-androstane-6α,17β-diol, 0.01 g. of benzoyl peroxide and 20 ml. of dimethylsulfoxide are employed and the reaction is carried out at 120° C. for 6 hours, to give 0.203 g. of the desired product as pure crystals melting at 154° C. Its infrared spectrum is identical with that of the authentic sample.

What is claimed is:

1. A process for preparing a $\Delta^4$-3-ketosteroid having the partial structure, with which only rings A and B are concerned, of the formula

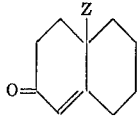

wherein Z represents an alkyl group or a hydroxymethyl group that may be etherified or esterified which comprises heating a 3,5-cyclosteroid having the partial structure, with which only rings A and B are concerned, of the formula

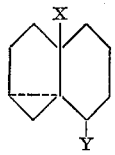

wherein X represents an alkyl group or a hydroxymethyl group that may be etherified or esterified; Y represents hydroxy group, an etherified hydroxy group or an esterified hydroxy group; or X and Y jointly may form a 6β,19-oxido linkage, together with an alkylsulfoxide, the said Z being as defined above with relation to the said X when the said X and Y separately are as defined above and hydroxymethyl group when the said X and Y jointly form a 6β,19-oxido linkage.

2. The process according to claim 1 wherein the reaction is carried out in the presence of a catalyst.

3. The process according to claim 1 wherein the said alkylsulfoxide is dimethylsulfoxide.

4. The process according to claim 2 wherein the said catalyst is benzoyl peroxide.

5. A process for preparing a 19-hydroxy-$\Delta^4$-3-ketosteroid having the partial structure, with which only rings A and B are concerned, of the formula

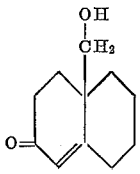

which comprises heating a 3,5-cyclosteroid having the partial structure, with which only rings A and B are concerned, of the formula

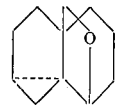

together with an alkylsulfoxide.

6. The process according to claim 5 wherein the reaction is carried out in the presence of a catalyst.

7. The process according to claim 5 wherein the said alkylsulfoxide is dimethylsulfoxide.

8. The process according to claim 6 wherein the said catalyst is benzoyl peroxide.

9. A process for preparing a $\Delta^4$-3-ketosteroid having the partial structure, with which only rings A and B are concerned, of the formula

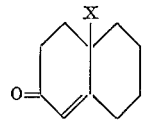

wherein X represents an alkyl group or a hydroxymethyl group that may be etherified or esterified which comprises heating a 3,5-cyclosteroid having the partial structure, with which only rings A and B are concerned, of the formula

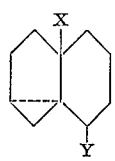

wherein X is as defined above and Y represents hydroxy group, an etherified hydroxy group or an esterified hydroxy group, together with an alkylsulfoxide.

10. The process according to claim 9 wherein the reaction is carried out in the presence of a catalyst.

11. The process according to claim 9 wherein the said alkylsulfoxide is dimethylsulfoxide.

12. The process according to claim 10 wherein the said catalyst is benzoyl peroxide.

No references cited.

LEWIS GOTTS, *Primary Examiner.*

THOMAS M. MESHBESHER, *Assistant Examiner.*